(12) United States Patent
Adachi et al.

(10) Patent No.: US 8,395,047 B2
(45) Date of Patent: *Mar. 12, 2013

(54) MOTOR CABLE ASSEMBLY AND METHOD OF MANUFACTURING CABLE MAIN BODY OF THE SAME

(75) Inventors: Hideomi Adachi, Kosai (JP); Hidehiko Kuboshima, Kosai (JP); Naoya Kawasaki, Kosai (JP)

(73) Assignee: Yazaki Corporation, Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 12/659,466

(22) Filed: Mar. 10, 2010

(65) Prior Publication Data

US 2010/0243321 A1 Sep. 30, 2010

(30) Foreign Application Priority Data

Mar. 30, 2009 (JP) .................................. 2009-082055

(51) Int. Cl.
*H02G 15/00* (2006.01)

(52) U.S. Cl. ....................... 174/74 R; 439/382; 439/445

(58) Field of Classification Search .................... 29/868; 439/382–385, 445; 174/74 R, 42, 74
See application file for complete search history.

(56) References Cited

U.S. PATENT DOCUMENTS

| 5,349,133 A * | 9/1994 | Rogers ............................ 174/36 |
| 5,537,742 A * | 7/1996 | Le et al. ........................ 29/869 |
| 5,710,851 A * | 1/1998 | Walter et al. .................... 385/86 |
| 6,460,642 B1 * | 10/2002 | Hirano .......................... 180/65.1 |
| 7,247,795 B2 * | 7/2007 | Sumi et al. .................... 174/74 R |
| 7,563,981 B2 * | 7/2009 | Ichikawa et al. ............ 174/72 A |
| 7,645,157 B2 * | 1/2010 | Mizutani et al. ............. 439/382 |
| 2007/0123105 A1 | 5/2007 | Tsukashima et al. |
| 2008/0261414 A1 | 10/2008 | Mizutani et al. |
| 2010/0248529 A1 * | 9/2010 | Adachi et al. ................ 439/447 |

FOREIGN PATENT DOCUMENTS

JP 2008-253017 10/2008

OTHER PUBLICATIONS

Official Communication for German Patent Application No. 102010002040.0 prepred by Patent Office on Dec. 14, 2010.
Second Office Action issued Dec. 20, 2012 in connection with Chinese Application No. 201010149354.4, with English translation.

* cited by examiner

*Primary Examiner* — Angel R Estrada
*Assistant Examiner* — Dimary Lopez
(74) *Attorney, Agent, or Firm* — Edwards Wildman Palmer LLP; James E. Armstrong, IV; Stephen D. LeBarron

(57) ABSTRACT

A motor cable assembly connecting a motor and an inverter includes a cable main body, which can move flexibly. The cable main body is manufactured and formed into a flat shape by arranging a plurality of cables in parallel in a row, covering an outer surface of the arranged cables with a braid, and covering further an outer surface of the covered cables. The motor cable assembly includes an inverter-side protector having a vibration absorbing portion supporting the cable main body at a position near the inverter-side connecting member so as to absorb the vibrating motion of the cable main body.

4 Claims, 7 Drawing Sheets

MOTOR CABLE ASSEMBLY AND METHOD OF MANUFACTURING CABLE MAIN BODY OF THE SAME

The priority application Number Japan Patent Application 2009-082055 upon which this patent application is based is hereby incorporated by reference.

FIELD OF THE INVENTION

This invention relates to a motor cable assembly connecting electrically a motor and an inverter and a method of manufacturing a cable main body of the motor cable assembly.

BACKGROUND OF THE INVENTION

Description of the Related Art

An electric vehicle or a hybrid vehicle includes a motor as a power source, an inverter generating 3-phase alternating current power for driving the motor, and a motor cable assembly connecting the motor and the inverter.

A motor cable assembly described in the Cited Patent Document 1, Japan Patent Published Application No. 2008-253017, is structured with a cable main body including a plurality of cables, a motor-side connecting member arranged at one end of the cable main body for connecting to the motor, an inverter-side connecting member at the other end of the cable main body and a cable support member arranged in a middle of the cable main body for supporting the middle of the cable main body at a car body.

The cable support member is fixed at the car body by an exclusive mount block and a fixing member. The cable support member, the mount block and the fixing member are fixing components for fixing the cable main body at the car body so as to control cable vibrating motion caused by vibration or shock generated at the car.

SUMMARY OF THE INVENTION

Objects to be Solved

The motor cable assembly by Prior Art has a following problem: a motor is a power source and also a source of vibrating motion so that the vibrating motion generated by the motor is transferred through the cable main body to the fixing components. In case when there is a large structural looseness at the fixing components, it is troublesome that a strange noise and/or damage may be led. Because of a structure of the car, the fixing components could not be provided in case.

The present inventor has a technological solution, in which, by positively transferring a vibrating motion of the motor and the car, and a shock generated at the car toward the cable main body, the cable main body is moved so as to absorb the vibrating motion. Thereby, a fixing components described in the cited Patent Document 1 could be eliminated, and the above problem could be solved.

The cable main body described in the Cited Patent Document 1 is structured by bundling a plurality of cables so as to have a round cross-section so that the cable main body has a large stiffness. Such cable main body would not have an effective vibrating motion. Even if the cable main body having a large stiffness could be vibrated, a force caused by the vibrating motion acts on the inverter-side connecting member of the cable main body. It may damage the inverter-side connecting member, or reduce reliability of connection.

According to the above problems, an object of the present invention is to provide a motor cable assembly which can generate effective vibrating motion at a cable main body. Another object is to provide a motor cable assembly which can prevent a damage of an inverter-side connecting member, and reduction of reliability of connection. Also, further object is to provide a method of manufacturing a cable main body used in the motor cable assembly.

How to Attain the Object of the Present Invention

In order to overcome the above problems and attain the object of the present invention, a motor cable assembly for connecting electrically a motor and an inverter includes a cable main body having a plurality of cables, a braid and a protecting member; a motor-side connecting member arranged at one end of the cable main body; an inverter-side connecting member arranged at the other end of the cable main body, and the plurality of cables is arranged in parallel in a row, and an outermost surface of the plurality of cables arranged in a row is covered by the braid, and an outer surface of the braid is covered by the protecting member.

According to the present invention, the cable main body is formed into a flat shape. Such flat-shape cable is easily bent, and easily moved in a vibrating motion by transferring vibration of the motor to the cable main body. This motion will help to absorb the vibration of the motor.

The motor cable assembling as mentioned above is further specified in that the braid is formed previously into a cylindrical shape, and the protecting member formed into a strip shape is wound around the outer surface of the braid and fixed with a winding tape.

According to the present invention, the cable main body is easily bent and easily manufactured.

The motor cable assembly as mentioned above further includes a resin member having a fix portion fixed directly or indirectly at the inverter and a vibration absorbing portion extending from the fix portion, and supporting the cable main body so as to absorb the vibrating motion of the cable main body.

According to the present invention, the cable main body is moved in a vibrating motion by transferring the vibration of the motor to the cable main body. The vibrating motion helps to absorb the vibration of the motor. When the cable main body is moved in the vibrating motion, a force by the vibrating motion acts generally at the inverter-side connecting member connected to the inverter. According to the present invention, the vibrating motion of the cable main body at a position of the vibration absorbing portion is absorbed by the vibration absorbing portion of the resin member fixed at the inverter.

The motor cable assembly as mentioned above is further specified in that the vibration absorbing portion includes a support portion supporting the plurality of cables at the inverter-side connecting member in parallel in a row.

According to the present invention, the plurality of cables at the inverter-side connecting member is supported in parallel in a row by the supporting portion of the vibration absorbing portion. Thereby, the cable main body is stably supported at the vibration absorbing portion. By supporting the cable main body, the vibration absorbing portion performs enough.

A method of manufacturing a motor cable assembly for connecting electrically a motor and an inverter as mentioned above includes a first step of inserting a plurality of cables into a cylindrical braid and arranging the plurality of cables in parallel in a row in the braid; a second step of winding a protecting member with a strip shape around an outer surface of the braid; and a third step of pressing a pair of flat surfaces provided at the outer surface of the braid by winding the protecting member so as to maintain the plurality of cables in parallel in a row, and winding around the protecting member with a winding tape.

According to the present invention, by processing the above steps, the flexible cable main body is manufactured. When the plurality of cables is simply covered by the braid and the outer surface of the covered cables is simply wound by the protecting member, the arranged cables may be disordered. According to the present invention, since covering and winding are processed while pressing, the flexible cable main body is manufactured securely without such disorder.

EFFECTS OF THE INVENTION

According to the present invention, by forming the cable main body flat shape, the flexible cable main body can be provided. Thereby, the cable main body can be moved in effective vibrating motion.

According to the present invention, since the cylindrical braid and the strip-shape protecting member are used, and the protecting member is wound around the cables covered with the braid, and the outer surface thereof is fixed by the winding tape, the flexible cable main body can be easily manufactured.

According to the present invention, since the resin member fixed at the inverter is provided and the vibration absorbing portion is arranged at the resin member, the vibrating motion and shock at the inverter-side connecting member can be absorbed by the vibration absorbing portion. Thereby, damage and reduction of reliability of connection of the inverter-side connecting member can be prevented.

According to the present invention, since the plurality of cables is supported stably by the support portion arranged at the vibration absorbing portion, the vibration absorbing portion can perform enough.

According to the present invention, the method of manufacturing the flexible cable main body can be provided.

The above and other objects and features of this invention will become more apparent from the following description taken in conjunction with the accompanying drawings.

DESCRIPTION OF THE PREFERRED EMBODIMENT

A motor cable assembly connecting a motor and an inverter includes a cable main body, which can move flexibly. The cable main body is manufactured and formed into a flat shape by arranging a plurality of cables in parallel in a row, covering an outer surface of the arranged cables with a braid, and covering further an outer surface of the covered cables.

The motor cable assembly includes a resin member. The resin member includes a fix portion fixed directly or indirectly to an inverter so as to support an inverter-side connection member of the motor cable assembly. The resin member further includes a vibration absorbing portion extending from the fix portion, and supporting the cable main body so as to absorb the vibrating motion of the cable main body.

Embodiments

Figure 1:
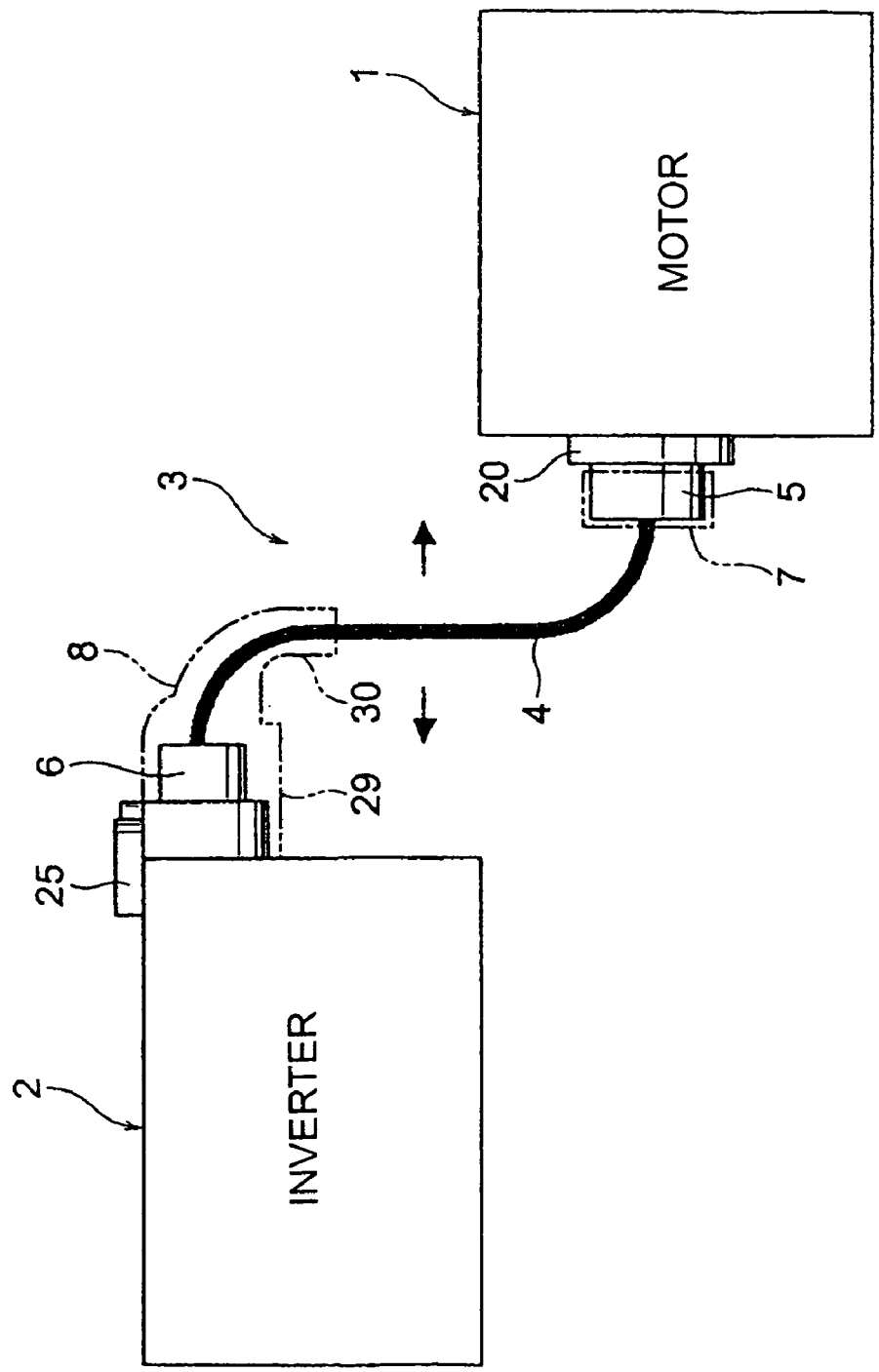
FIG. 1 is an illustration showing a condition using a motor cable assembly according to the present invention.
Figure 2:
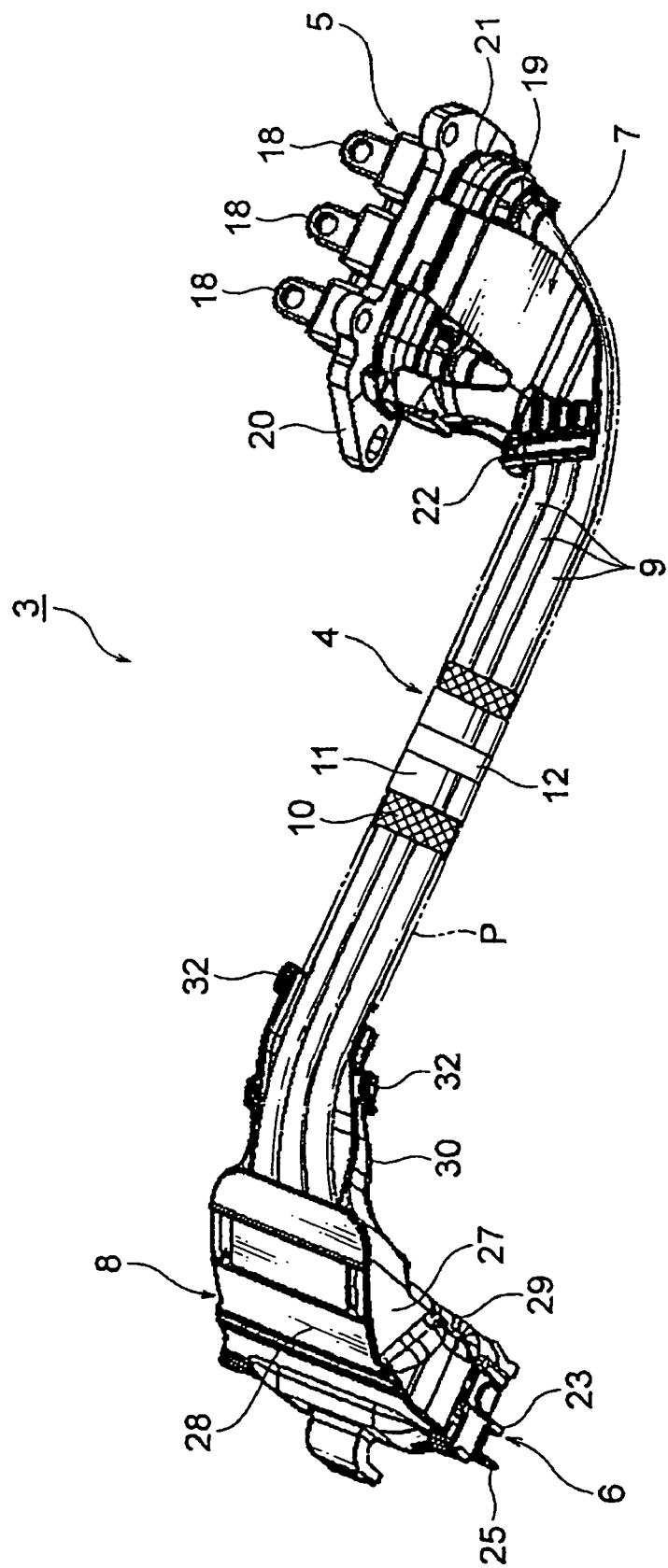
FIG. 2 is a perspective view of the motor cable assembly.
Figure 3:
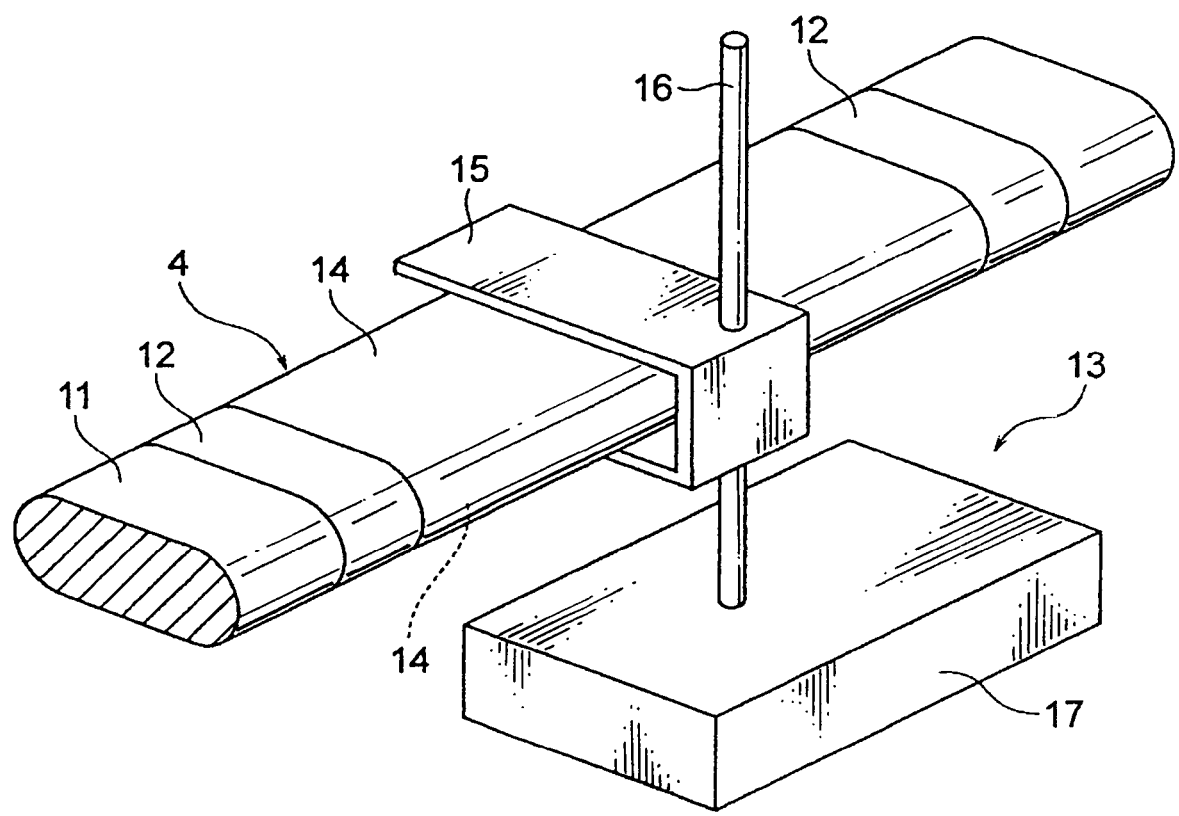
FIG. 3 is an illustration of mounting a cable main body of the motor cable assembly.
Figure 4:
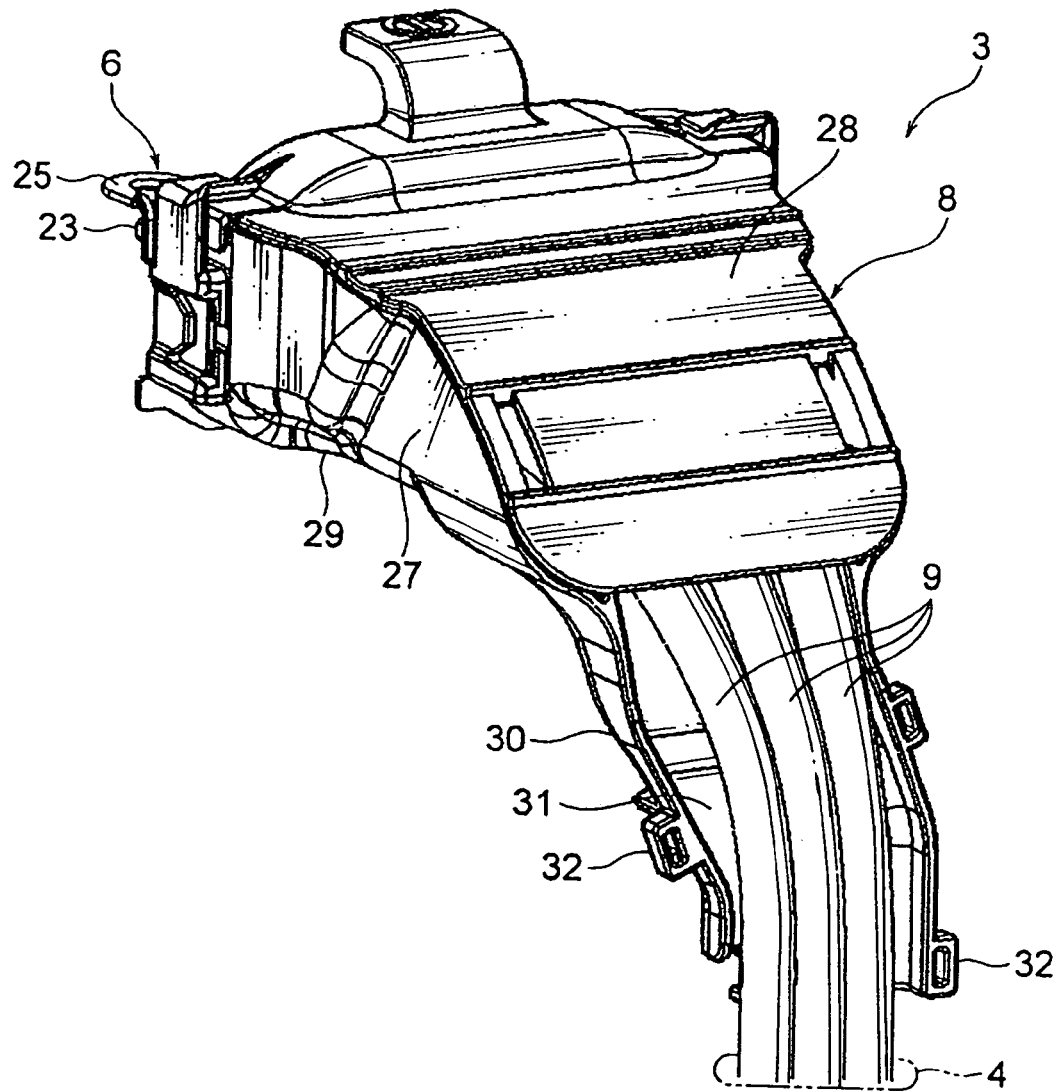
FIG. 4 is a perspective view of an inverter-side connecting member and a protector (resin member) of the motor cable assembly.
Figure 5:
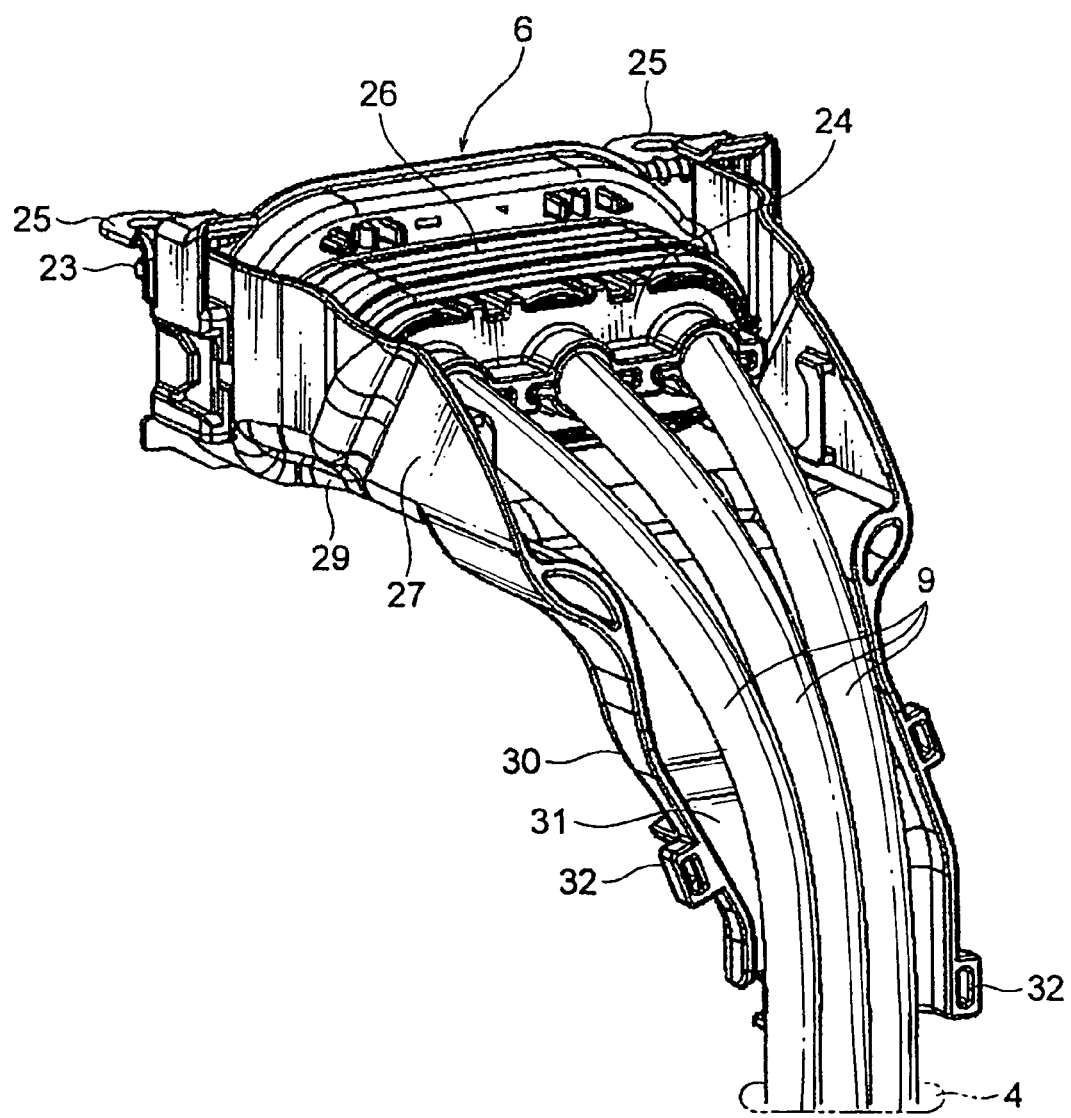
FIG. 5 is a perspective view showing a condition of removing a cover from the inverter-side connecting member shown in FIG. 4.
Figure 6:
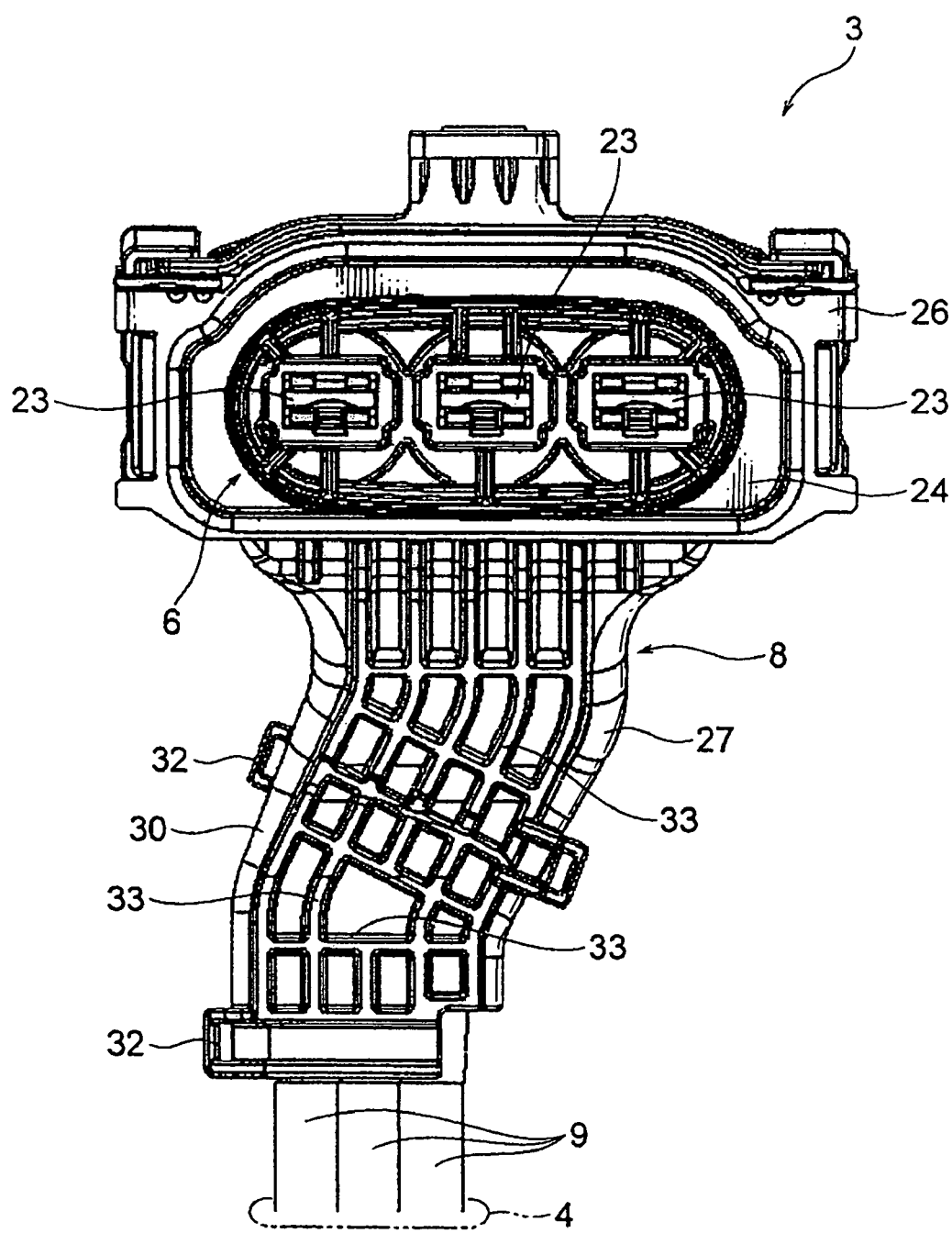
FIG. 6 is a front view of the inverter-side connecting member and the protector (resin member) of the motor cable assembly.
Figure 7:
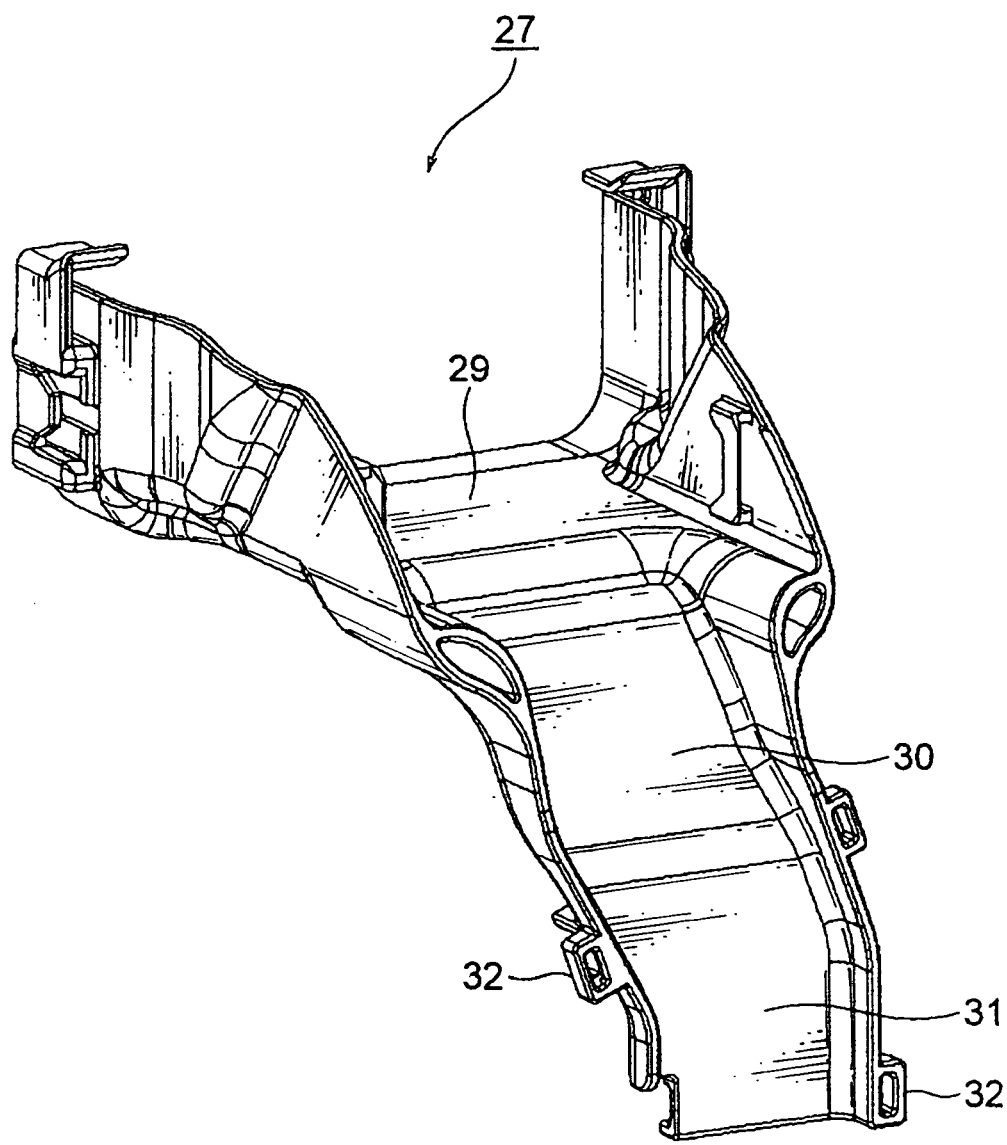
FIG. 7 is a perspective view of a protector main body of the protector shown in FIG. 4.

An embodiment will be described with reference to figures. FIG. 1 is an illustration showing a condition using a motor cable assembly according to the present invention. FIG. 2 is a perspective view of the motor cable assembly. FIG. 3 is an illustration of mounting a cable main body of the motor cable assembly. FIG. 4 is a perspective view of an inverter-side connecting member and a protector (resin member) of the motor cable assembly. FIG. 5 is a perspective view showing a condition of removing a cover from the inverter-side connecting member shown in FIG. 4. FIG. 6 is a front view of the inverter-side connecting member and the protector (resin member) of the motor cable assembly. FIG. 7 is a perspective view of a protector main body of the protector shown in FIG. 4.

In FIG. 1, a motor 1 and an inverter 2 in an electric vehicle or a hybrid cat are connected electrically by a motor cable assembly 3. The motor cable assembly 3 includes a cable main body 4 having a plurality of cables, a motor-side connecting member 5 arranged at one end of the cable main body 4, an inverter-side connecting member 6 arranged at the other end of the cable main body 4, a motor-side protector 7 corresponding to the motor-side connecting member 5, and an inverter-side protector 8 (a resin member) corresponding to the inverter-side connecting member 6.

The motor cable assembly 3 has a vibration absorbing structure, in which vibration and shock from the motor 1 and a vehicle are transferred to the cable main body 4, thereby the cable main body 4 is moved in a vibrating motion in a direction shown with arrows in FIG. 1, and the vibration and shock are absorbed by the vibrating motion. The motor cable assembly 3 also has a structure, in which a vibrating motion of the cable main body 4 at a position near to the inverter-side connecting member 6 is absorbed by the inverter-side protector 8 so that a bad affect to the inverter-side connecting member 6 is prevented. Each structure of the motor cable assembly 3 will be described below.

In FIG. 2, the cable main body 4 includes three high-voltage cables 9, a cylindrical braid 10 receiving the three cables 9 and a protecting member 11 covering around an outer surface of the braid 10. In the cable main body 4, the three cables 9 are arranged in parallel in a row (align in a plane). The braid 10 around the three cables 9 arranged in parallel is braided into a cylindrical shape with a conductive thin wire. The braid 10 as a shielding material is fixed at the both ends thereof to each ground point of the motor-side connecting member 5 and the inverter-side connecting member 6 by a predetermined method.

The protecting member 11 is a covering material for protecting inside thereof against outside thereof. The protecting member 11 made of a flexible sheet having anti-wear property is wound around the outer surface of the braid 10. The protecting member 11 is exampled by a twist tube. The protecting member 11 is provided at a predetermined position with a winding tape 12 so as to prevent disorder of the cable main body 4.

The protecting member 11 is slightly shorter than the brad 10 about length along lengthwise of the cable main body 4. Both Ends of the protecting member 11, in which the braid 10 is exposed, are covered by an acetate tube (not shown) formed by winding an acetate-cloth tape. A two-dot chain line P in FIG. 2 shows the protecting member 11 provided between the motor-side protector 7 and the inverter-side protector 8.

To form the cable main body 4 having three cables 9 arranged in parallel, a jig 13 shown in FIG. 3 is preferably used about workability and productivity.

The jig 13 includes a u-shape clamp member 15 for clamping a pair of flat surfaces 14 formed at the outer surface of the protecting member 11, a post 16 for arranging the clamp member 15 at a predetermined height, and a base block 17 for fixing a base-side end of the post 16. The cable main body 4 is maintained in a condition of arranging the plurality of cables in parallel by clamping in the clamp member 15, and wound with the winding tape 12. Thereafter, the acetate tube (not shown) is formed. The clamp member 15 may have preferably a simple clip structure.

The cable main body 4 is formed into a flat shape so that, if the cables 9 are thin wires, the cable main body 4 can be easily bent.

In FIG. 2, the motor-side connecting member 6 includes terminals 18, each arranged at each end of the three cables 9, an insulation housing 19 receiving and fixing the terminals 18, an ground point 20 earthed to the motor 1, and a metal shell 21 for connecting one end of the braid 10 to the ground point 20. The motor-side connecting member 5 has a known structure so that a detailed description is omitted.

The motor-side protector 7 is a resin member made of an insulation material for protecting the motor-side connecting portion 5 and guiding one end of the cable main body 4. A fixing portion 22 is for fixing the one end of the cable main body 4 by a bundling band (not shown). In the embodiment, the acetate tube may be preferably formed on the fixing portion 22.

In FIGS. 5, 6, the inverter-side connecting member 6 includes terminals 23, each arranged at each other end of the three cables 9, an insulation housing 24 receiving and fixing the terminals 23, an ground point 25 earthed to the inverter 2 (FIG. 1), and a metal shell 26 for connecting other end of the braid 10 to the ground point 25. The inverter-side connecting member 6 has a known structure so that a detailed description is omitted.

In FIGS. 4-7, the inverter-side protector 8 is an insulation resin member, and includes a protector main body 27 and a cover 28 engaging with the protector main body 27. The inverter-side protector 8 performs protecting function and guiding function for the other end of the cable main body 4 and the inverter-side connecting member 6. The inverter-side protector 8 also performs vibration absorbing function for the cable main body 4 at a position near to the inverter-side connecting member 6. The inverter-side protector 8 is formed into a L-shape when viewed from side.

The protector main body 27 includes a fix portion 29 and a vibration absorbing portion 30. The fix portion 29 is formed for supporting the inverter-side connecting member 6 and fixed directly or indirectly to the inverter 2 (FIG. 1). The fix portion 29 is formed to fit with the inverter-side connecting member 6. The vibration absorbing portion 30 extends from the fix portion 29.

The vibration absorbing portion 30 supports the cable main body 4 at a position near the inverter-side connecting member 6 so as to absorb vibration generated at the cable main body 4. A parallel support portion 31 is arranged at an inner surface of the vibration absorbing portion 30. The parallel support portion 31 is structured to support three cables 9 of the cable main body 4 at the other end of the cable main body 4 in parallel in a row. Lock portions 32 for fixing the other end of the cable main body 4 with a binding band (not shown) are arranged at an outer surface of the vibration absorbing portion 30.

The outer surface, opposed side to the parallel support portion 31, of the vibration absorbing portion 30 is provided with a plurality of ribs 33. The plurality of ribs 33 is formed over a continuous portion between the fix portion 29 and the vibration absorbing portion 30 toward the fix portion 29. The plurality of ribs 33 is for adjusting a stiffness of the vibration absorbing portion 30 so as to make an area from the continuous portion to the vibration absorbing portion 30 more rigid or more flexible by arranging number of the ribs, a height of the rib and a location of the rib.

The protector main body 27 is formed so as not to vibrate easily by arranging the plurality of ribs 33 as shown in FIG. 6. Thereby, the protector 27 can support the cable main body 4 so as to move the cable main body 4 effectively in a vibrating motion along the arrows in FIG. 1.

The cover 28 is formed so as to cover mainly the inverter-side connecting member 6, for example.

According to the above structure, as shown in FIG. 1, the motor cable assembly 3 connects electrically the motor 1 and the inverter 2. In such condition, when the motor 1 is vibrated and the vehicle is driven, vibration and shock from outside are transferred to the motor cable assembly 3, thereby the cable main body 4 is vibrated along the arrows in FIG. 1. According to the present invention, the cable main body 4 is flat shaped so that the cable main body 4 can be easily bent. Thus, the cable main body 4 can be moved effectively in a vibrating motion so as to absorb the above vibration and shock.

When the cable main body is moved in a vibrating motion, usually the force by the vibrating motion is loaded on the inverter-side connecting member 6 connected with the inverter 2. However, according to the present invention, the vibrating motion of the cable main body 4 at the vibration absorbing portion 30 is absorbed by the vibrating absorbing portion 30 of the inverter-side protector 8 fixed at the inverter 2 (FIGS. 4-7). Thereby, it is prevented that the force of the vibrating motion is loaded on the inverter-side connecting member 6, so that the inverter-side connecting member 6 is prevented from damage and reduce of reliability of connection.

According to the present invention, the plurality of cables 9 is supported stably by arranging the parallel support portion 31 at the vibration absorbing portion 30, so that the vibration absorbing portion 30 can perform enough its function.

While, in the embodiment, the present invention is described, it is not limited thereto. Various change and modifications can be made with the scope of the present invention.

The invention claimed is:

1. A motor cable assembly for connecting electrically a motor and an inverter, comprising:
    a cable main body having a plurality of cables, a braid and a protecting member;
    a motor-side connecting member arranged at one end of the cable main body,
    an inverter-side connecting member arranged at the other end of the cable main body, and a resin member having a fix portion fixed directly or indirectly at the inverter and a vibration absorbing portion extending from the fix portion, and supporting the cable main body so as to absorb the vibrating motion of the cable main body,
    wherein the plurality of cables is arranged in parallel in a row, and an outermost surface of the plurality of cables arranged in a row is covered by the braid, and an outer surface of the braid is covered by the protecting member.

2. The motor cable assembly according to claim 1, wherein the braid is formed previously into a cylindrical shape, and the protecting member formed into a strip shape is wound around the outer surface of the braid and fixed with a winding tape.

3. The motor cable assembly according to claim 1, wherein the vibration absorbing portion includes a support portion supporting the plurality of cables at the inverter-side connecting member in parallel in a row.

4. The motor cable assembly according to claim 2, wherein the vibration absorbing portion includes a support portion supporting the plurality of cables at the inverter-side connecting member in parallel in a row.

* * * * *